United States Patent [19]
Kristof

[11] 3,750,836
[45] Aug. 7, 1973

[54] POWER STEERING SYSTEM
[75] Inventor: John J. Kristof, Marion, Ohio
[73] Assignees: Apsco Manufacturing Corporation; Air-O-Matic Power Steer Corporation, both of Cleveland, Ohio; part interest to each
[22] Filed: Nov. 15, 1971
[21] Appl. No.: 198,757

[52] U.S. Cl. .................... 180/79.2 R, 137/625.68
[51] Int. Cl. .............................................. B62d 5/08
[58] Field of Search ................ 180/79.2 R; 137/625.68, 625.67

[56] References Cited
UNITED STATES PATENTS

| | | | |
|---|---|---|---|
| 1,647,404 | 11/1927 | Gehrig | 180/79.2 R |
| 3,217,745 | 11/1965 | Tate | 137/625.68 X |
| 2,608,263 | 8/1952 | Garrison | 180/79.2 R |
| 2,061,120 | 11/1936 | Vorech | 180/79.2 R |
| 2,069,540 | 2/1937 | Sanford | 180/79.2 R |
| 2,037,505 | 4/1936 | Eaton | 180/79.2 R |
| 2,409,842 | 10/1946 | Eaton | 180/79.2 R X |
| 2,553,940 | 5/1951 | Quartullo | 180/79.2 R |
| 2,565,929 | 8/1951 | Onde | 180/79.2 |

*Primary Examiner*—Benjamin Hersh
*Assistant Examiner*—John A. Pekar
*Attorney*—Hal D. Cooper

[57] ABSTRACT

The power steering system employs a drag link valve adjustably threaded on the end of the drag link. In one embodiment, the drag link valve controls operation of a relay valve which, in turn, controls operation of a power cylinder. In other embodiments, the drag link valve directly controls the operation of the power cylinder. The disclosed valves each comprise a pair of valves selectively operable for right and left turning movements of the vehicle. Each valve includes a reciprocable valve stem supporting inlet and outlet face valves operable in sequence to open and close the inlet and outlet ports in a predetermined sequence.

10 Claims, 7 Drawing Figures

INVENTOR
JOHN J. KRISTOFF
BY Yount and Tarolli
ATTORNEYS

INVENTOR
JOHN J. KRISTOFF
BY Yount and Tarolli
ATTORNEYS

POWER STEERING SYSTEM

This invention relates to a power steering system for use with vehicles and, more particularly, to an improved pneumatic power steering system with an improved valving arrangement.

There are disclosed in prior U. S. Pat. Nos. 3,199,414 and 2,964,119 pneumatic steering systems which employ a pneumatic cylinder to provide a power assist in the steering of the vehicle. As disclosed in those patents, the conventional steering mechanism is supplemented by a pneumatic cylinder which is operatively connected to the tie rod for applying a force which will assist in turning the wheels of the vehicle. The operation of the pneumatic cylinder is controlled by a valve carried on one end of the drag link with operation of the valve being controlled by movements of the steering wheel. It is this same general type of environment in which this invention is particularly useful.

While the power steering systems disclosed in the aforementioned patents have proven generally satisfactory, there are certain aspects of those systems which have proven disadvantageous in practical application. More specifically, the valving arrangement disclosed in those patents has employed valves with O-rings which are designed to slide across an orifice to open and close the valve. With such an arrangement, the repetitive movement of the O-rings across the relatively sharp edges of the orifice frequently results in damage to the O-ring which, in turn, diminishes the sealing capabilities of the ring. Although this condition can be alleviated to some extent by accurately machining the mating surfaces thereby to minimize the adverse affects on the O-rings as they slide across the orifices, such practice is relatively expensive and materially increases the manufacturing cost of the valve.

Another problem which has been experienced relates to the method of installing the power steering system in the vehicle. As previously noted, the valves in the aforementioned patents are attached to one end of the drag link. However, because of the construction of the valve, it has been necessary to shorten the drag link to accommodate the attachment of the valve. This has been accomplished by cutting off a portion of the drag link, attaching the valve body to the severed end of the link and, thereafter, welding the body to the link. Although this method of installation has produced a satisafactory installation, it is apparent that substantial labor is involved in the installation process. Moreover, it entails a modification of the original chassis and is therefore a subject of concern to the chassis manufacturer. Still further, the attachment of the valve body to the end of the drag link has required removal of the conventional ball socket assembly normally attached to the drag link and has, therefore, eliminated what had previously been an adjustable connection which could be used to lengthen or shorten the drag link.

It is the principal object of this invention to provide an improved power steering system which overcomes each of the foregoing problems, as well as others present in the prior art, and which, in addition, has substantial advantages in terms of improved control of the fluid in the steering system.

Another important object of this invention is to provide a power steering system which has a greatly simplified valving mechanism and which materially reduces the manufacturing cost but which provides improved reliability in operation.

More specifically, the principles of this invention are embodied in a power steering system in which a valve housing is threadably and adjustably attached to the threaded end of a conventional drag link with the pitman arm extending into the valve housing and selectively operating two drag link valves in the housing. In one embodiment of the invention, an air motor actuated pair of relay valves are controlled by the drag link valves with the relay valves, in turn, controlling operation of the pneumatic cylinder. In another form of the invention, the drag link valves directly control operation of the pneumatic cylinder. With both embodiments, no alterations of the drag link are required to install the system with the valve housing merely replacing the conventional ball socket assembly normally employed in steering mechanisms.

Still more specifically, the principles of this invention contemplate a valve housing having a fluid chamber therein; inlet and outlet ports in the housing communicate with the fluid chamber and an exhaust port communicates with the fluid chamber; a first valve member cooperates with the inlet passage to control the flow of fluid therethrough while a second valve member cooperates with the exhaust passage to control communication between the exhaust port and the fluid chamber; a valve stem extends into the fluid chamber with said first and second valve members supported on the stem to provide sequential operation of the valve members upon longitudinal movement of the stem whereby initial movement of the stem closes one valve and continued movement of the stem opens the other valve.

A specific feature of the invention is the elimination of O-rings which slide across orifices in the valve body and, in lieu thereof, the use of face valves employing generally radial seats and cooperating radial valve faces.

Another specific aspect of the invention is embodied in a valve having a valve housing, a fluid chamber in the housing with inlet, outlet and exhaust ports in the housing communicating with the fluid chamber, said valve actuator stem further including a lost motion connection with one of the valve members whereby the valve actuator stem is movable to a first position to actuate one valve and, upon further movement, to a second position which actuates the other valve.

Further objects, advantages and features of the invention will be apparent from the following detailed description of the preferred embodiment thereof made with reference to the accompanying drawings and, in which:

Figure 1:
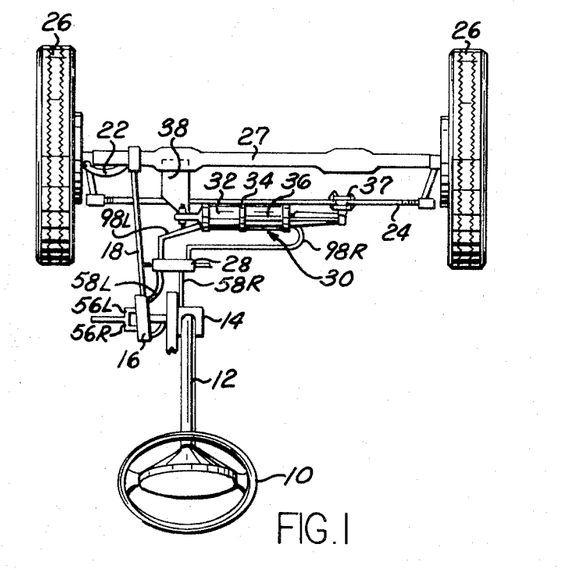
FIG. 1 is a schematic view of a portion of a vehicle embodying the present invention.

Referring now more in detail to the drawings, wherein the showings are for the purposes of illustrating a preferred embodiment of the invention only and not for the purposes of limiting same, FIG. 1 illustrates the incorporation of the invention in a steering system for a vehicle. As there illustrated, the steering system includes a steering wheel 10, a steering column 12, a steering gear system 14 and a swingable pitman or steering arm 16. The outer extremity of the steering arm 16 is normally adapted to engage a ball socket assembly which is adjustably carried on the end of a drag link 18. However, in accordance with the principles of this invention, in lieu of the conventional ball socket assembly, a drag link valve, indicated generally by the reference numeral 20, is carried by the drag link 18 and actuated by the steering arm 16 in a manner hereinafter described. The drag link is connected to a steering rod 22 which is connected, in conventional manner, to a tie rod 24. The tie rod is operable to impart turning movements to a pair of wheels 26 carried by the rigid front axle 27.

The power steering system, in addition to the drag link valve 20, also includes a relay valve 28 and a double acting power cylinder, indicated generally by the reference numeral 30.

The power cylinder 30 is of conventional construction and includes a cylinder housing 32 with a piston 34 movable therein. A piston rod 36 extends outwardly of the cylinder housing and is connected to a bracket 37 on the tie rod 24. The cylinder 32 is supported on a bracket 38 carried by the axle or other rigid frame member of the vehicle.

THE DRAG LINK VALVE

Figures 3, 3A, 4:
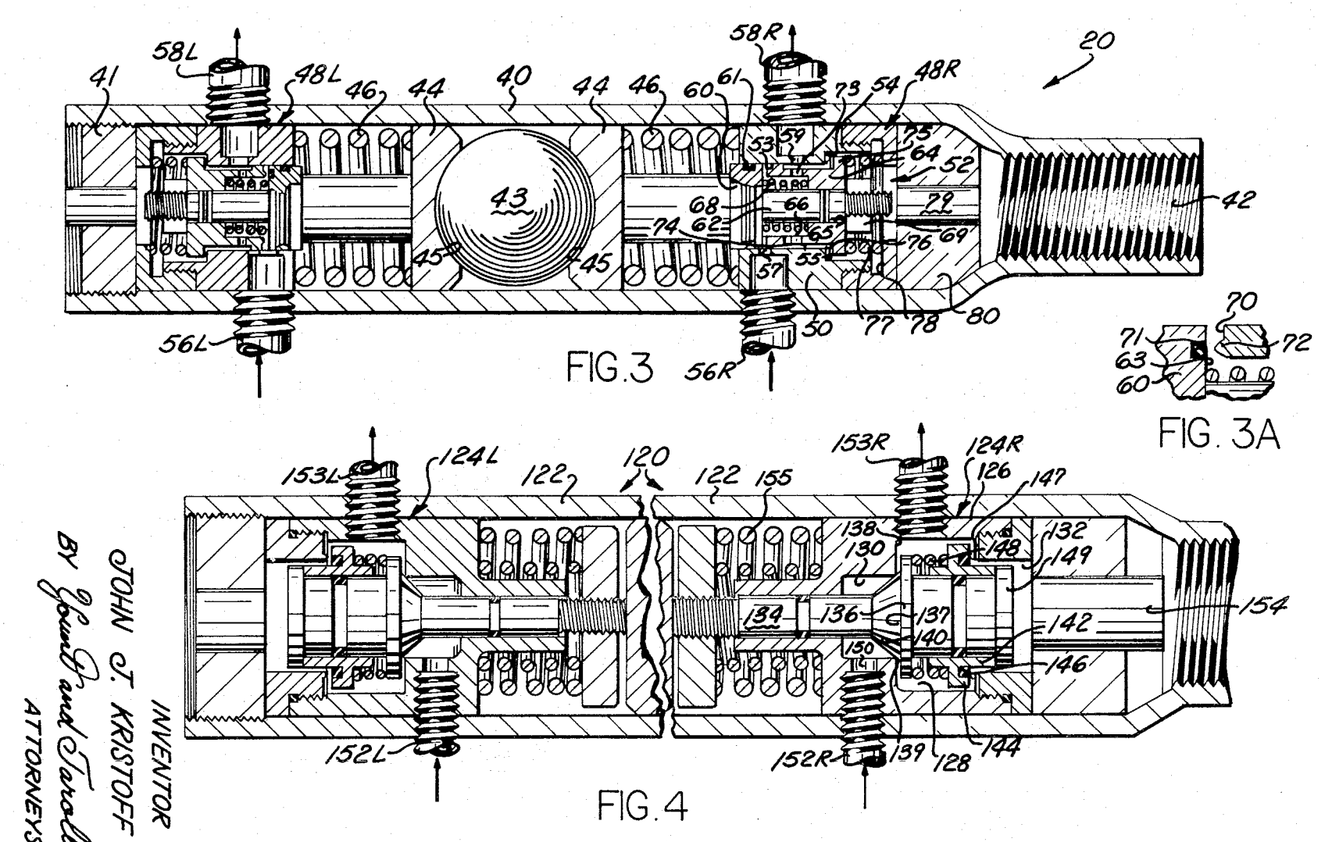
FIG. 3 is a longitudinal cross-sectional view of a drag link valve which is used with the relay valve of FIG. 2.
FIG. 3A is a fragmentary sectional view, on an enlarged scale, of a portion of the valve of FIG. 3.
FIG. 4 is a partial longitudinal cross-sectional view of a modified form of the drag link valve.

The drag link valve 20 will now be described in detail. This valve 20 comprises an elongated cylindrical valve housing 40 closed at one end by appropriate means such as a threaded plug 41. The other end of the valve housing has an internally threaded connector portion 42 which is adapted to be threadedly received over the end of the drag link 18. The steering or pitman arm 16 extends into the valve housing through an appropriate slotted opening and has a steering ball or knuckle 43 on the interior end thereof. The steering ball 43 cooperates with a pair of actuator plungers 44, each of which has an arcuate surface 45 cooperating with the curved surface of the ball 43. A pair of springs 46 act against the plungers 44 to bias the plungers into engagement with the ball 43.

The plungers 44 cooperate with a pair of valves indicated generally by the reference numerals 48R and 48L. Since the details of each of these valves are the same, only one of the valves will be specifically described hereinafter but the same reference numerals will apply to the same parts of both valves.

The valve 48R comprises a valve body 50 having a fluid chamber 52 formed therein. The fluid chamber 52 comprises a pair of coaxial bores 53,54 with a radially extending shoulder 55 defining a valve seat at the juncture at the two bores. A fluid inlet passage 56R extends through the valve housing 40 and the valve body 50, opening through a port 57 into the bore 53. An outlet passage 58R also extends through the valve housing and valve body opening through an outlet port 59 into the bore 53.

Slidably received within the bore 53 is a valve piston 60, the diameter of which is approximately the same as the inner diameter of the bore 53. The piston 60 includes a sealing O-ring 61 which cooperates with the wall of the bore 53 to provide a sealing relationship therebetween. The valve piston further includes a piston rod or stem 62 which extends from one side face 63 of the piston 60 through the bore 53 and into the bore 54.

A valve member 64 having a through bore 65 and a counter bore 66 is received over the rod 62. An O-ring 67 carried by the rod 62 provides a sealing relationship between the rod and the bore 65. A spring 68 is received in the counter bore 66 and acts between the valve member 64 and the piston 60 to bias the valve member away from the piston. A threaded nut 69 on the end of the rod 62 serves to limit the movement of the valve member 64 along the rod 62 away from the piston 60.

The valve member 64 is substantially cylindrical in configuration and includes at one end a valve face 70. The valve face 70 is adapted to cooperate with the side face 63 of the piston 60 to control the flow of fluid from the inlet port 57 to the outlet port 59. Thus, as is apparent from FIG. 3A, the side face 63 of the piston 60 includes a recessed O-ring 71 which is adapted to cooperate with the face 70. If desired, the radial face 70 may include a projecting circumferential portion 72 which is aligned with the O-ring 71 and facilitates a sealing compression of the O-ring. The valve member 64 further includes a plurality of radially opening ports 73 which communicate at their outer end with a circumferential recessed groove 74 on the periphery of the cylindrical valve member 64. The ports 73 communicate at their inner end with the counter bore 66. As is apparent from FIG. 3, the groove 74 normally overlies the outlet port 59 thereby providing fluid communication from the counter bore 66 through the ports 73 to the outlet port.

The other end of the valve member 64 includes a radially extending circumferential flange 75 which carries a seal 76 with the seal 76 being adapted to cooperate with the shoulder 55 to provide a sealing relationship between the bore 53 and the bore 54. A spring 77 acts between the end of the valve member 64 and a surface 78 on the valve body to bias the member 64 to a position where the seal 76 engages the surface 55.

A passage 79 extends through a plug 80 in the end of the housing 40 with the passage 79 comprising an exhaust passage for the valve chamber.

The operation of the valve 20 is as follows. With the parts positioned as shown in FIG. 3, the piston 60 is biased by the spring 68 to the left. The spring 68 also tends to bias the valve member 64 to the right but, because of the stronger spring 77, the valve member 64 is biased to the left to a position wherein the seal 76 engages the radial shoulder 55. The length of the valve member 64 is such that with the seal 76 in engagement with the radial shoulder 55, the end face 70 is axially spaced from the face 63 and the seal 71 on the piston 60. This spaced relationship permits fluid to flow through the inlet passage 56R, the inlet port 57 and into the counter bore 66 where it then passes through the port 73 to the outlet port 59 and the outlet passage 58R. Since the seal 76 is in engagement with the radial shoulder 55, the exhaust passage 79 is isolated from the fluid passing through the valve.

The valve is actuated to stop the flow of fluid by the actuator plunger 44 which engages the piston 60 to move the piston to the right as viewed in FIG. 3. As the piston 60 and its associated piston rod 62 is moved to the right, the valve member 64, because of the greater strength of the valve spring 77, remains stationary until the side face 63 on the piston 60 engages the end face 70 on the valve member 64. With that relationship of parts, any further flow of fluid through the inlet port 57 is prevented due to the sealing relationship between the piston and the end face of the valve member 64. Further longitudinal movement of the piston 60 will carry the valve member 64 with it against the bias of the spring 77 so that, as the combined piston and valve member move longitudinally, the seal between the radial shoulder 55 and the seal 76 is broken thereby placing the exhaust passage 79 in fluid communication with the counter bore 66 and the outlet passage 58.

It will be noted that the valve thus described provides a sequential operation in which initial movement of piston 60 is independent of the valve member 64 for a predetermined period during which the inlet passage is closed. Thereafter, the valve and stem move together to open the exhaust valve. The same sequential operation is obtained in the reverse operation. Thus, as piston 60 and its rod 62 move to the left, the valve member 64 moves to the left under the bias of spring 77 until the seal 76 engages the shoulder 55 thereby closing the exhaust valve. Thereafter, the piston 60 and rod 62 move relative to the valve member 64 until the nut 69 engages the valve member 64 thus preventing any further movement of the piston. However, at that point, the face 70 on the valve member 64 has separated from the seal 71 thereby opening a passage through which the fluid may flow from the inlet port 57 into the counter bore 66.

THE RELAY VALVE

Figure 2:
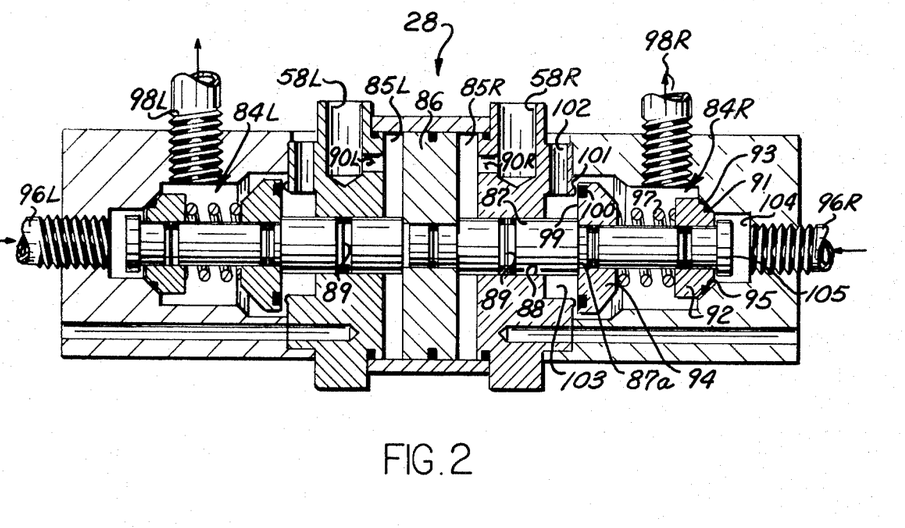
FIG. 2 is a longitudinal cross-sectional view of a relay valve embodying the principles of this invention.

Referring now to FIG. 2, the relay valve will now be described in detail. The relay valve 28 comprises a valve housing 82 having right and left fluid chambers 84R and 84L. Since the valve chambers 84R, 84L and the valves received therein are identical, only one valve will be described in detail but it is to be understood that the same reference numerals apply to the same parts in the other valve.

The valve housing 82 includes a fluid motor chamber 85 in which a piston 86 is slidably received. A piston rod 87 extends from opposite sides of the piston 86 through an opening 88 in the end walls of the fluid chamber 85 and into the fluid chambers 84R and 84L. An appropriate seal 89 may be carried on each of the projecting rods 87 to provide a seal between the opening 88 and the rod 87. A pair of right and left fluid inlet ports 90R and 90L are formed in the valve housing and communicate with the fluid chambers 85R and 85L.

The end of the piston rod or stem 87 extending into the valve chamber 84R carries an inlet valve 92 and an exhaust valve 94. As illustrated, the inlet valve 92 is supported on the piston rod 87 for sliding movement longitudinally of the rod. The end face 93 of the valve 92 is frustoconical in configuration and carries a seal 91 which is adapted to cooperate with a correspondingly configured valve seat surface 95 formed in the walls of the housing 82. A fluid inlet passage 96R is formed in the valve housing with the flow of fluid through the passage 96R being controlled by the inlet valve 92. A spring 97 acts against the valve 92 to normally bias the valve to a closed position wherein the flow of fluid through the passage 96R into the chamber 84R is prevented. An outlet passage 98R, also formed in the valve housing 82, is in communication with the fluid chamber 84R at one end and is connected at its other end to the fluid cylinder 30.

The exhaust valve 94, like the inlet valve 92, is received over the piston rod 87 for sliding movement longitudinally of the rod. The spring 97 is interposed between the two valves 92,94 so that it also acts on the exhaust valve to bias it to a position wherein, as shown in FIG. 2, it is in engagement with a radial abutment shoulder 87a on the rod 87. The valve member 94 includes a radially extending face 99 in which there is a recessed seal 100. The seal 100 is adapted to engage a radial shoulder which defines a valve seat 101 on the housing 82. An exhaust passage 102 extends through the housing 82 adjacent the seat 101.

As thus described, the valve comprises an inlet valve 92, an exhaust valve 94 and a fluid chamber 84R which may be conveniently divided into an exhaust chamber 103 and an inlet chamber 104.

The operation of the relay valve is as follows. Assuming the parts to be in the position illustrated in FIG. 2 and with the piston 86 in its normally centered position, flow of fluid from the inlet chamber 104 into the main fluid chamber is prevented by the seated position of the inlet valve 92. At the same time the exhaust valve 94 is maintained in engagement with the shoulder 87a by the bias of the spring 97. In that position, the seal 100 is spaced from the seat 101 thereby communicating the exhaust chamber 103 with the chamber 84. To open the valve an unbalanced condition is created in the fluid motor chamber 85, in a manner to be hereinafter described, so that the piston 86 is displaced to the left. As the piston is displaced, the rod 87 moves longitudinally to the left, as viewed in FIG. 2. During the initial movement of the rod 87, the spring 97 continues to bias the inlet valve 92 to a seated position. However, the exhaust valve moves with the rod 87 under the bias of spring 97 until the seal 100 engages the valve seat 101, at which time the exhaust chamber 103 is isolated from the fluid chamber 84. Thereafter, the exhaust valve 94 remains stationary while the rod 87 moves relative to that valve. Continued movement of the rod 87 to the left causes a radial flange 105 on the end of the rod 87 to engage the valve member 92 and displace that valve member to the left against the bias of spring 97. Movement of the valve member 92 to the left breaks the seal with valve seat 95 and places the inlet chamber 104 in communication with the fluid chamber 84 whereby fluid may flow through the inlet passage 96R and out of the valve through the passage 98R.

To close the valve the piston 86 and the piston rod 87 is moved to the right, as viewed in FIG. 2. Since the radial shoulder 87a was separated from the exhaust valve 94 during the opening movements of the valve, the initial closing movement of the rod 87 has no effect on the exhaust valve 94 and it remains closed under the bias of spring 97. However, as the rod 87 moves to the right, the flange 105 moves away from valve 92 and permits the spring 97 to act on the valve 92 to displace the valve 92 to the right until the inlet valve has been closed. Thereafter, continued movement of the rod 87 to the right causes engagement between the radial shoulder 87a and the valve 94 to displace the exhaust valve to the right thereby re-establishing communication between the exhaust chamber 103 and the main fluid chamber.

It will be noted that the operation of the relay valve has the same operating characteristics as the drag link valve 20 in that a sequential operation is obtained both in the opening and closing movements of the valve.

THE POWER STEERING SYSTEM

The drag link valve 20 and the relay valve 28 are interconnected in the manner shown in FIG. 1 to form a power steering system. Pressurized fluid, preferably air, is introduced to the drag link valves 48R and 48L through the inlet conduits 56R and 56L respectively. The outlet passages 58R and 58L of the two valves are connected to the inlet ports 90R and 90L of the fluid motor in the relay valve 28. The relay valve also includes two fluid pressure inlets 96R and 96L. The two outlets 98R and 98L of the relay valve are connected to opposite ends of the cylinder 30.

The operation of the power steering system is as follows. In a non-steering condition, the exhaust valves of both of the valves 48R and 48L are closed and fluid pressure flows through the two inlet conduits 56R,56L, through the valves, out of the outlet conduits 58R, 58L and into the two fluid motor chambers 85R and 85L on opposite sides of the piston 86. Since equal pressure is applied to both sides of the piston 86, a balanced condition is present and the relay valve remains in the position shown in FIG. 2. In that condition, the conduits 98R and 98L connected to the cylinder 30 are both vented to atmosphere and the power steering system is then inoperative.

In a steering condition, and assuming the vehicle is to be turned to the right, the turning of the steering wheel 10 to the right will, through the steering linkage cause the ball 43 and the actuator plunger 44 to move to the left against the bias of the spring 46. The valve 48L will then function in the manner heretofore described to close the inlet port 57 and vent the outlet passage 58L to atmosphere. This operation of the valve 48L occurs in the sequence described above so that the inlet valve is first closed and the exhaust valve is thereafter opened. With the passage 58L vented to atmosphere, the fluid motor chamber 85L will also be connected to atmosphere thereby creating an unbalanced condition on the piston 86 in the relay valve 28. This unbalanced condition will result in the piston 86 moving to the left. As the piston 86 moves to the left, the valve 84R will operate in the manner heretofore described to close the exhaust valve 94 and, in sequence, open the inlet valve 92 thereby placing the pressurized fluid in the inlet conduit 96R in communication with the outlet conduit 98R. Pressurized fluid will then flow through the conduit 98R to the cylinder 30 causing the piston 34 to move to the left. As the piston 34 moves to the left, the piston rod and tie rod 24 will also move to the left, as viewed in FIG. 1, thereby turning the wheels to the right. Since the opposite end of the cylinder 34 is vented to the atmosphere through the valve 84L, there is no resistance offered to the movement of the piston 34 to the right.

The reverse operation will, of course, occur as the steering wheel is returned to its original position and a similar sequence will be followed if the wheels are to be turned to the left.

The disclosure arrangement of the valves thus provides a power assist for the steering operation. However, it is to be noted that in the event of a power failure and pressurized fluid is not available, full manual control over the steering of the vehicle is still available. Thus, assuming the absence of fluid pressure, steering movements of the steering wheel 10 will cause the actuator plungers 44 in the drag link 20 to act through the springs 46 and the valve housing 40 to impart movement to the drag link 18 which, in turn, will cause turning movement of the wheels. In this connection, it is also to be noted that in a power assist condition initial movement of the steering wheel will cause some movement of the drag link valve housing 40 which will, through the drag link 18, cause some initial movement of the wheels before the power assist is operative.

ADDITIONAL SPECIES OF THE INVENTION

A modified form of the drag link valve is illustrated in FIG. 4. The form of valve illustrated in that Figure, as well as those to be described hereinafter, may be used in a power steering system without a relay valve. In such a system, the outlet ports of the drag link valve would be connected directly to the power cylinder 30 with the drag link valve directly controlling operation of the cylinder 30.

Turning now to the details of the modified form of valve, indicated generally by the reference numeral 120, that valve comprises a valve housing 122 adapted to be threaded to the end of the drag link 18 in the same manner as the drag link valve 20. Disposed within the valve housing 122 are a pair of valves 124R and 124L. Since, as in the embodiment of FIG. 3, the two valves are identical, only one will be described in detail but it is to be understood that the same reference numerals apply to both valves. The valve 124R includes a valve body 126 having a fluid chamber 128 formed therein. The valve body further includes a fluid inlet chamber 130 and a fluid exhaust chamber 132.

A valve stem 134 is positioned in the valve housing and extends through each of the chambers 128, 130 and 132 with one end of the stem extending outwardly of the valve housing and being adapted to cooperate with the steering ball and actuator in the same manner as in the embodiment of FIG. 3. The valve stem 134 includes an inlet valve 136 defined by a radially extending circumferential flange having a radially extending surface 137 on one face thereof. The surface 137 is adapted to cooperate with a corresponding face 138 defined by a radial shoulder at the juncture of the two chambers 130 and 128. As shown, the shoulder 138 includes an axially extending circumferential lip 139 which projects from the shoulder 138 into the fluid chamber 128. The lip 139 slidably engages a circumferential surface 140 on the valve stem 134 immediately adjacent to the radial flange 136 for a purpose to be hereinafter described.

A cylindrical exhaust valve 142 is slidably received over the inner end of the valve stem 134 with the exhaust valve including a radially extending shoulder 144. The shoulder 144 carries a recessed seal 146 which is adapted to sealingly engage a radial shoulder 147 defining a valve seat on the housing 126 thereby to seal the exhaust chamber 132 from the fluid chamber 128. A spring 148 is received over the valve stem 134 and is positioned between the flange 136 and the shoulder 144 on the valve member 142. The spring 148 normally biases the valve 142 toward the valve seat 147 with an end cap 149 on the end of the stem 134 limiting movement of the valve member 142 in that direction.

The valve further includes an inlet port 150 and an outlet port 151 with the inlet port 150 communicating with an inlet conduit 152R through which pressurized fluid may be introduced and the outlet port 151 communicating with an outlet conduit 153R which is connected to one end of the cylinder 30. An exhaust passage 154 is in communication with the exhaust chamber 132.

The operation of the described modified drag link valve 120 is as follows. In the position of the parts shown in FIG. 4, the spring 155 acts on the valve stem 134 to maintain it in engagement with the actuator plunger 44 and the steering ball 43. In that position, the inlet valve 136 is closed with the lip 139 being in engagement with the surface 140 of the valve stem 134 thereby preventing flow of fluid through the valve. The exhaust valve 142 is spaced from the valve seat 147 with this relationship being maintained by the restraint imposed on the valve 142 by the end cap 149. To actuate the valve, the stem 134 is moved to the right. As the stem moves, the surface 140 slides along sealing lip 139 and maintains the inlet chamber 130 isolated from the fluid chamber 128 while the stem moves through its initial path of travel. However, as the stem moves to the right it carries with it the cap 149 which thereby permits the spring 148 to displace the exhaust valve 142 to the right. Continued movement of the stem 134 causes the seal 146 on the exhaust valve 142 to engage the valve seat 147 thereby isolating the exhaust chamber 132 from the fluid chamber 128. At this same time, the stem 134 has moved a sufficient amount that the surface 140 has been displaced axially beyond the sealing lip 139 thereby placing the inlet chamber 130 in communication with the fluid chamber 128. Pressurized fluid then flows through the inlet port 150 into the fluid chamber 128 and out of the valve through the conduit 153R to the cylinder. The cylinder is then operative to provide a power assist in the manner described in connection with the embodiment of FIG. 3.

Figure 5:
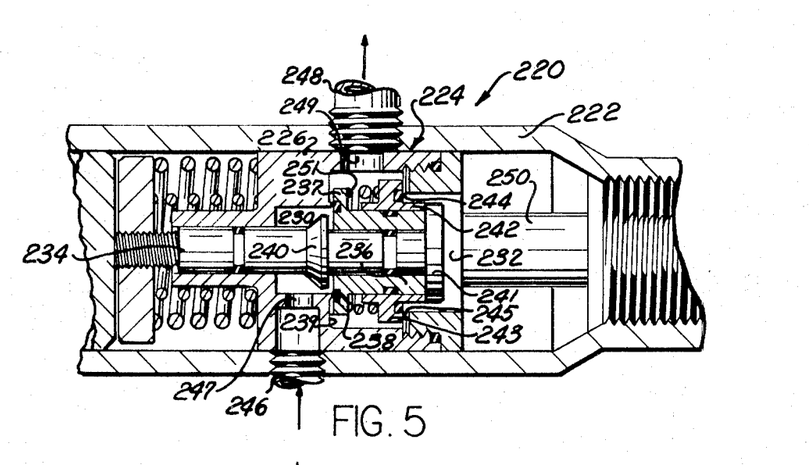
FIG. 5 is a partial longitudinal cross-sectional view of another modification of the drag link valve.

Referring now to FIG. 5, there is illustrated a further modification of the drag link valve. As illustrated in that Figure, the drag link valve is indicated generally by the reference number 220 and comprises a valve housing 222 in which a pair of valves are contained with only one of the valves 224 being illustrated. As in the embodiments of FIGS. 3 and 4, the valve housing 220 is adapted to be threaded on the end of the drag link 18 with the steering ball and actuator plunger being the same as that illustrated in FIG. 3.

The valve 224 comprises a valve body 226 in which there is a fluid chamber 228. The valve body further includes an inlet chamber 230 and an exhaust chamber 232 with a valve stem 234 extending into the valve body and through each of the chambers 230, 228 and 232.

Received over the stem 234 is a cylindrical inlet valve 236 which is movable relative to the stem 234. The valve 236 includes a radially extending circumferential flange 237 in which there is a recessed seal 238. The seal 238 is adapted to cooperate with a seat defined by a radially extending shoulder 239 formed on the valve body at the juncture of the chambers 228 and 230. The valve member 236 is adapted to slide longitudinally of the stem 234 between a flange 240 and an end cap 241 carried by the stem.

A cylindrical exhaust valve 242 is slidably received over the inlet valve 236 with the valve 242 including a radially extending circumferential flange 243 in which there is recessed a seal 244. The seal 244 is adapted to sealingly engage a valve seat 245 on the valve body 226 to isolate the exhaust chamber 232 from the chamber 228.

An inlet passage 246 is formed in the valve housing and communicates with an inlet port 247. An outlet conduit 248 communicates with an outlet port 249 and an exhaust port 250 communicates with the exhaust chamber 232.

A spring 251 is interposed between the two flanges 237 and 243 on the respective valve members 236 and 242 to bias the two valve members in opposite directions.

The operation of the drag valve 220 is as follows. Assuming the parts to be in the relationship shown in FIG. 5, the spring 251 biases the valve 236 to the left until the seal 238 engages the valve seat 239 thereby closing the valve and preventing the flow of fluid through the valve. The spring 251 also biases the valve 242 toward its associated valve seat 245 but, because of the radially extending end cap 241, the exhaust valve 242 is maintained open. To open the valve, the stem 234 is moved to the right, as viewed in FIG. 5. The initial opening movements of the stem 234 have no effect on the inlet valve 236 which is longitudinally spaced from the flange 240 on the valve stem 234. However, the initial movements of the stem 234 carries with it the end cap 241 which enables the spring 251 to move the exhaust valve 242 relative to the valve 236 to a position wherein the seal 244 engages the valve seat 245 thereby closing the exhaust port and isolating the exhaust chamber 232 from the fluid chamber 228. At this point, further movement of the stem 234 to the right causes engagement between the flange 240 and the valve 236 so that the valve 236 thereafter moves with the stem 234 to the right against the bias of the spring 251. As the valve 236 moves to the right, the sealing engagement with the valve seat 239 is broken and the inlet chamber 230 is placed in fluid communication with the chamber 228. Thereafter, pressurized fluid may flow through the inlet port 247 into the chamber 228 and out through the conduit 248 to the power cylinder to actuate the power steering assist cylinder in the manner previously described.

Figure 6:
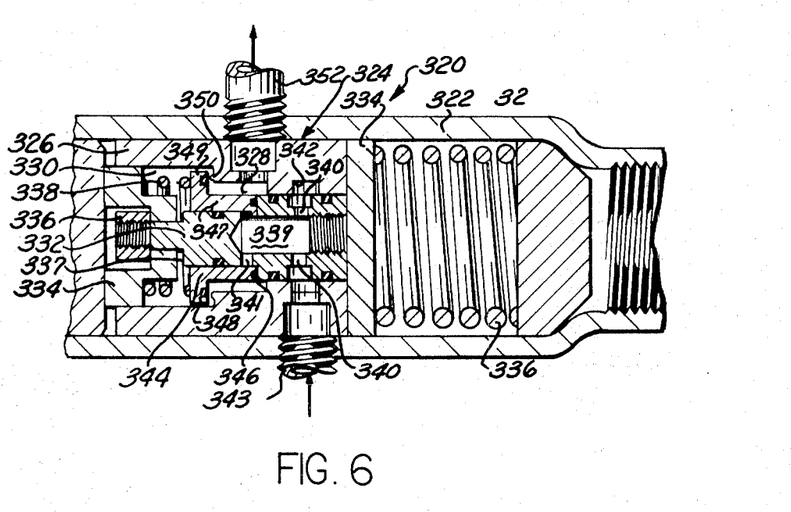
FIG. 6 is a partial longitudinal cross-sectional view of still another modified form of the drag link valve.

A further modification of the drag link valve is illustrated in FIG. 6 wherein the valve 320 comprises a valve housing 322 in which a pair of valves are received, only one of which, 324, is illustrated. The valve includes a valve housing 326 in which a fluid chamber 328 is formed. The valve body 326 is counter bored at one end to form an exhaust chamber 330. Extending through the valve body 326 is a valve stem 332 which has, at one end, a piston 334 slidable longitudinally within the valve housing 322. A spring 336 in the valve housing biases the piston 334 and the valve stem 332 to the left as viewed in FIG. 6. The opposite end of the valve stem 332 extends through an opening in the actuator plunger 334 and is connected thereto by a threaded nut 336. The connection between the valve stem 332 and the actuator plunger 334 has a limited range of movement independent of the stem 332 between the nut 336 and a shoulder 337 on the stem 332. A spring 338 normally biases the plunger 334 to the left against the nut 336.

The stem 332 includes an internal fluid cavity 339. Communicating with the cavity 339 are a pair of longitudinally spaced inlet and outlet ports 340 and 341 respectively. The inlet ports 340 are aligned with a circumferential groove 342 in the wall of the valve body 326 with the groove 342 being in communication with an inlet passage 343.

A cylindrical valve member 344 is slidably received over the stem 332. The valve member 344 includes a seal 346 recessed in one end face thereof with the seal being adapted to cooperate with a valve seat 347 defined by a radial shoulder formed on the stem 332. The valve 344 further includes a radially extending circumferential flange 348 at the other end thereof with the flange 348 carrying a recessed seal 349. This latter seal 349 is adapted to cooperate with a valve seat 350 defined by the radial shoulder at the juncture of the chambers 328 and 330. The spring 338 abuts the flange 348 and normally biases the valve member 344 toward its respective valve seats.

The operation of the valve 320 is as follows. With the parts in the position illustrated in FIG. 6, fluid entering through the inlet passage 343 is prevented from flowing out of the cavity 339 by the valve member 344 which overlies the outlet port 341 and which is biased by the spring 338 into sealing engagement with the valve seat 347. At the same time, the seal 349 is spaced from the seat 350 thereby communicating the exhaust chamber 330 with the chamber 328. To open the valve, the actuator plunger 334 is moved to the right by the steering ball 43. The plunger engages shoulder 337 on stem 332 and moves the stem to the right against the bias of spring 336. At the same time, the spring 338 acts against valve 344 to maintain seal 346 seated against seat 347. The combined movement of the plunger valve member 344 and stem 332 continues until the seal 349 engages the valve seat 350 thereby isolating the exhaust chamber 330 from the fluid chamber 328. Thereafter, the actuator and stem continue movement to the right independent of the valve member 344 until the outlet ports 341 are uncovered and fluid may then flow from the cavity 339 past the face seal into the chamber 328 and out of the valve through the outlet conduit 352 to the power cylinder 30.

It will be apparent from the foregoing that each of the embodiments of the drag link valve is adapted to be threadedly received over the end of the drag link 18 thereby obviating the problem of cutting off the drag link and welding the valve body to the end thereof. Moreover, the threaded connection between the valve housing and the drag link provides a certain amount of adjustability which was heretofore not available.

It is also apparent that each of the drag link valves, as well as the embodiment employing a relay valve, provides a sequential operation whereby one of the valves is operated either to open or close at a point in the sequence prior to the opening and closing movements of the other of the valves. This is accomplished in each of the valves by a lost motion connection coupled with the use of springs acting between the valves to permit one valve to be moved independent of the other. Moreover, each valve has the inlet and outlet valves carried by a single reciprocating stem thereby providing both a compact valve and one which has a minimum of parts.

It is also to be emphasized that in each embodiment of the valve, the need for O-rings which slide across an orifice has been entirely eliminated with each of the valves employing only face seals which avoid the problems heretofore enumerated.

Although the principles of the invention have been disclosed in connection with certain embodiments, neither the embodiments illustrated nor the terminology employed in describing them is intended to be limiting but rather it is my desire to be limited only by the scope of appended claims.

I claim:
1. An improved power steering system for use in turning the wheels of a vehicle in response to turning movements of a steering wheel, said system including a source of fluid pressure, a power cylinder actuatable upon introduction of fluid thereto to impar turning movements to the wheels, fluid passage means connecting said fluid pressure source with said power cylinder and a valve assembly connected with said fluid passage means for controlling the flow of fluid to said power cylinder, the improvement comprising,
   said valve means comprising valve body means for defining first and second fluid chambers,
   first and second inlet passages in said valve body means communicating with said first and second chambers respectively,
   first and second outlet passages in said valve body means communicating with said first and second chambers respectively,
   a first valve member in said first chamber movable between an open position wherein fluid may flow from said first inlet passage through said first chamber to said first outlet passage and a closed position blocking a flow of fluid between said first inlet passage and said first outlet passage,
   a second valve member in said second chamber movable between an open position wherein fluid may flow from said second inlet passage through said second chamber to said second outlet passage and a closed position blocking fluid flow between said second inlet passage and said second outlet passage,
   first and second exhaust passages in said valve body means communicating with said first and second chambers respectively,
   a third valve member in said first chamber movable between a closed position blocking fluid flow between said first chamber and said first exhaust passage and an open position wherein said first exhaust passage is connected in fluid communication with said first chamber,
   a fourth valve member in said second chamber movable between a closed position blocking fluid flow between said second chamber and said second exhaust passage and an open position wherein said second exhaust passage is connected in fluid communication with said second chamber, and
   valve actuator means extending into said first and second chambers for effecting sequential operation of said first and third valve members upon turning movement of the steering wheel in a first direction to effect a flow of fluid under pressure to one end portion of said power cylinder and a turning of the vehicle in one direction and for effecting sequential operation of said second and fourth valve members upon turning movement of the steering wheel in a second direction to effect a flow of fluid under pressure to another end portion of said power cylinder,
   said valve actuator means including a first valve actuator stem extending into said first chamber and connected with said first and third valve members, means for moving said first valve actuator stem through a first increment of movement to effect operation of said first valve member from the open position to the closed position with said third valve member in its closed position and for continuing movement of said first valve actuator stem through a second increment of movement to effect operation of said third valve member from the closed position to the open position with said first valve member in the closed position to prevent fluid communication between said first inlet passage and said first exhaust passage upon movement of said third valve member to its open position, said valve actuator means further including a second valve actuator stem extending into said second chamber and connected with said second and fourth valve members, means for moving said second valve actuator stem through a first increment of movement to effect operation of said second valve member from the open position to the closed position with said fourth valve member in its closed position and for continuing movement of said second valve actuator stem through a second increment of movement to effect operation of said fourth valve member from the closed position to the open position with said second valve member in the closed position to prevent fluid communication between said second inlet passage and said second exhaust passage upon movement of said fourth valve member to its open position.

2. A power steering system as set forth in claim 1 and further including first biasing means in said first chamber normally biasing said first and third valve members toward their closed positions and second biasing means in said second chamber normally biasing said second and fourth valve members toward their closed positions, first means restraining movement of one of said first and third valve members toward a closed position whereby said first biasing means is effective to bias one of said first and third valve members to a closed position, and second means restraining movement of one of said second and fourth valve members toward a closed position whereby said second biasing means is effective to bias one of said second and fourth valve members to a closed position.

3. The power steering system of claim 2 wherein said first restraining means comprises first abutment means on said first valve actuator stem and said second restraining means comprises second abutment means on said second valve actuator stem.

4. The power steering system of claim 1 wherein said valve actuator means further includes an air motor connected with said first and second valve actuator stems, said motor being operable to reciprocate said first valve actuator stem in said first chamber and to reciprocate said second valve actuator stem in said second chamber.

5. The power steering system of claim 1 wherein both of said first and third valve members are movable longitudinally along said first valve actuator stem and wherein both of said second and fourth valve members are movable longitudinally along said second valve actuator stem.

6. The power steering system of claim 1 further including a lost motion connection between said first and second valve actuator stems and said valve members whereby movement of said first valve actuator stem through the first increment of movement in one direction is effective to close said first valve member before said third valve member is opened while movement of said first valve actuator stem in the opposite direction is effective to close said third valve member before said first valve member is opened.

7. A power steering system as set forth in claim 1 further including a fluid actuated motor means operatively connected to said first and second valve actuator stems for actuating said valve means, and means for selectively operating said fluid motor means.

8. A power steering system as set forth in claim 7 wherein said vehicle includes a steering linkage including a drag link rod and a steering arm, said selectively operable means comprising a valve assembly carried by said drag link rod and actuatable by movements of said steering arm to control the introduction of fluid to said motor.

9. A power steering system as set forth in claim 8 wherein said valve assembly includes a housing detachably and adjustably connected to a threaded end of said drag link rod for unitary movement with said drag link rod.

10. In the power steering system of claim 9 wherein said housing has a threaded opening formed therein with said threaded end of said drag link rod being threadedly received in said threaded opening.

* * * * *

UNITED STATES PATENT OFFICE
CERTIFICATE OF CORRECTION

Patent No. 3,750,836    Dated August 7, 1973

Inventor(s) John J. Kristof

It is certified that error appears in the above-identified patent and that said Letters Patent are hereby corrected as shown below:

Change Assignee from "Apsco Manufacturing Corporation; Air-O-Matic Corporation" to --Sycon Corporation--.

Signed and sealed this 18th day of December 1973.

(SEAL)
Attest:

EDWARD M. FLETCHER, JR.
Attesting Officer

RENE D. TEGTMEYER
Acting Commissioner of Patents